United States Patent [19]
Kim

[11] Patent Number: 5,627,937
[45] Date of Patent: May 6, 1997

[54] APPARATUS FOR ADAPTIVELY ENCODING INPUT DIGITAL AUDIO SIGNALS FROM A PLURALITY OF CHANNELS

[75] Inventor: Jong-Il Kim, Incheon, Rep. of Korea

[73] Assignee: Daewoo Electronics Co. Ltd., Incheon, Rep. of Korea

[21] Appl. No.: 393,294

[22] Filed: Feb. 23, 1995

[51] Int. Cl.$^6$ ........................................ G10L 9/00
[52] U.S. Cl. ................................. 395/2.38; 375/240
[58] Field of Search ............................ 395/2, 2.1, 2.14, 395/2.33, 2.38, 2.39; 375/240, 241; 370/83, 118; 341/51, 95

[56] References Cited

U.S. PATENT DOCUMENTS

| | | | |
|---|---|---|---|
| 5,414,795 | 5/1995 | Tsutsui et al. | 395/2.38 |
| 5,491,773 | 2/1996 | Veldhuis et al. | 395/2.38 |

FOREIGN PATENT DOCUMENTS

0559348  9/1993  European Pat. Off. .

OTHER PUBLICATIONS

James D. Johnston "Estimation of Perceptual Entropy Using Noise Masking Criteria", ICASSP 88; Internaitonal Conference On Acoustics, Speech And Signal Processing, vol. 5, pp. 2524–2527, Apr. 1988.

*Primary Examiner*—Benedict V. Safourek
*Attorney, Agent, or Firm*—Anderson Kill & Olick P.C.

[57] ABSTRACT

A novel apparatus, capable of adaptively encoding input digital audio signals from N number of channels, comprises N number of filters for filtering the input digital audio signals, respectively; a first estimator for estimating a first parameter for each of the input digital audio signals; a second estimator for estimating perceptual entropies of the respective frames for each of the input digital audio signals based on the first parameter, to thereby derive a mean and a standard deviation of a first frame group, and for generating second frame groups including F number of frames for each of the N number of channels; a first bit allocation unit for determining bits for each of the second frame groups based on the perceptual entropies for the second frame groups and mean and standard deviation parameters and for generating bit allocation information corresponding to the determined bits for the second frame groups; a second bit allocation unit for determining bits for the respective subbands of each frame included in each of the second frame groups based on the first parameter and the generated bit allocation information; N number of quantizers for quantizing the filtered audio signals in response to the corresponding bit allocation information for the respective subbands of the first frame group; and a circuit for formatting the quantized audio signal together with the generated bit allocation information.

4 Claims, 2 Drawing Sheets

5,627,937

APPARATUS FOR ADAPTIVELY ENCODING INPUT DIGITAL AUDIO SIGNALS FROM A PLURALITY OF CHANNELS

FIELD OF THE INVENTION

The present invention relates to a digital audio encoding apparatus; and, more particularly, to an improved apparatus for adaptively encoding input digital audio signals from a plurality of channels based on a perceptual entropy for each of the input digital audio signals consistent with the human auditory perception.

DESCRIPTION OF THE PRIOR ART

Transmission of digitized audio signals makes it possible to deliver high quality audio signals comparable to those of a compact disc and/or a digital audio tape. When an audio signal is expressed in a digital form, a substantial amount of data need be transmitted especially in the case of high definition television system. Since, however, the available frequency bandwidth assigned to such digital audio signals is limited, in order to transmit the substantial amounts of digital data, e.g., 768 Kbps per channel for 16 bit PCM(Pulse Code Modulation) audio signal with 48 KHz sampling frequency, through the limited audio bandwidth of, e.g., about 128 KHz, it becomes inevitable to compress the digital audio data.

Among the various audio compression devices or techniques, the so-called MPEG(Moving Pictures Expert Group)-Audio algorithm, which employs a psychoacoustic algorithm, has been suggested for HDTV application.

The MPEG-Audio algorithm employs four primary parts of: subband filtering, psychoacoustic modeling, quantizing and coding, and frame formatting. The subband filtering is a process of mapping, from the time domain to the frequency domain, an input PCM digital audio signal. A filterbank with B(e.g., 32) subbands may be used. In each subband, 12 or 36 samples are grouped for the processing thereof; and the grouped samples from said B subbands, i.e., B×12 or 36, constitute a "frame", which is a processing unit for the encoding, transmission and decoding of audio signals. The psychoacoustic modeling creates a set of data, e.g., SMR (signal-to-mask ratio) data, for each subband or group of subbands to control the quantizing and coding thereof. Available bits are, then, adaptively allocated to each subband of a frame with reference to the SMR in the process of quantizing and coding the subband samples. A frame formatter formats the frame data together with other required side information in a suitable fashion for transmission.

In the above MPEG audio technique, however, since a fixed number of bits is allocated to each frame, it cannot afford to reflect such statistical properties as mean, standard deviations, and perceptual entropies of the input digital audio signal which may vary continuously among the frames. Further, in case where input digital audio signals having different perceptual entropies are provided to the conventional device using such prior art technique, it encodes the input digital audio signals without any regard to the perceptual entropies, resulting in a poor human auditory perception.

SUMMARY OF THE INVENTION

It is, therefore, a primary object of the invention to provide a novel apparatus capable of adaptively encoding input digital audio signals for a plurality of channels based on a perceptual entropy for each of the input digital audio signals, thereby enhancing the coding efficiency and the audio quality.

In accordance with one aspect of the present invention, there is provided a novel apparatus for adaptively encoding input digital audio signals from N number of channels wherein each of the input digital audio signals includes a plurality of frames and each frame contains a plurality of subbands wherein N is a positive integer, which comprises: N number of subband filtering means arranged in parallel for receiving and filtering the input digital audio signals, respectively, on a subband-by-subband basis; first estimation means for estimating signal-to-mask ratio data, sound pressure levels and masking thresholds for the respective subbands included in each of the input digital audio signals; second estimation means for estimating perceptual entropies of the respective frames included in each of the input digital audio signals based on the estimated signal-to-mask ratio data, sound pressure levels and masking thresholds, to thereby derive a mean and a standard deviation parameters for an inter-channel frame group including N×F number of current and previous frames for the total N number of channels, said inter-channel frame group corresponding to the estimated perceptual entropies, and for generating an intra-channel frame group including F number of current and previous frames for each of the N number of channels wherein F is a positive integer; first bit allocation means for adaptively determining bits for each of the intra-channel frame groups based on the estimated perceptual entropy for each of the intra-channel frame groups and the mean and standard deviation parameters and for generating bit allocation information corresponding to the determined bits for each of the intra-channel frame groups; second bit allocation means for determining bits for the respective subbands included in each of the intra-channel frame groups based on the estimated signal-to-mask ratio data and the generated bit allocation information, and for generating bit allocation information corresponding to the determined bits for each of the subbands; N number of quantizing means arranged in parallel for quantizing the filtered subband audio signals for the N number of channels in response to the corresponding bit allocation information generated for the respective subbands in each of the intra-channel frame groups; and means for formatting the quantized audio signals together with the generated bit allocation information.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
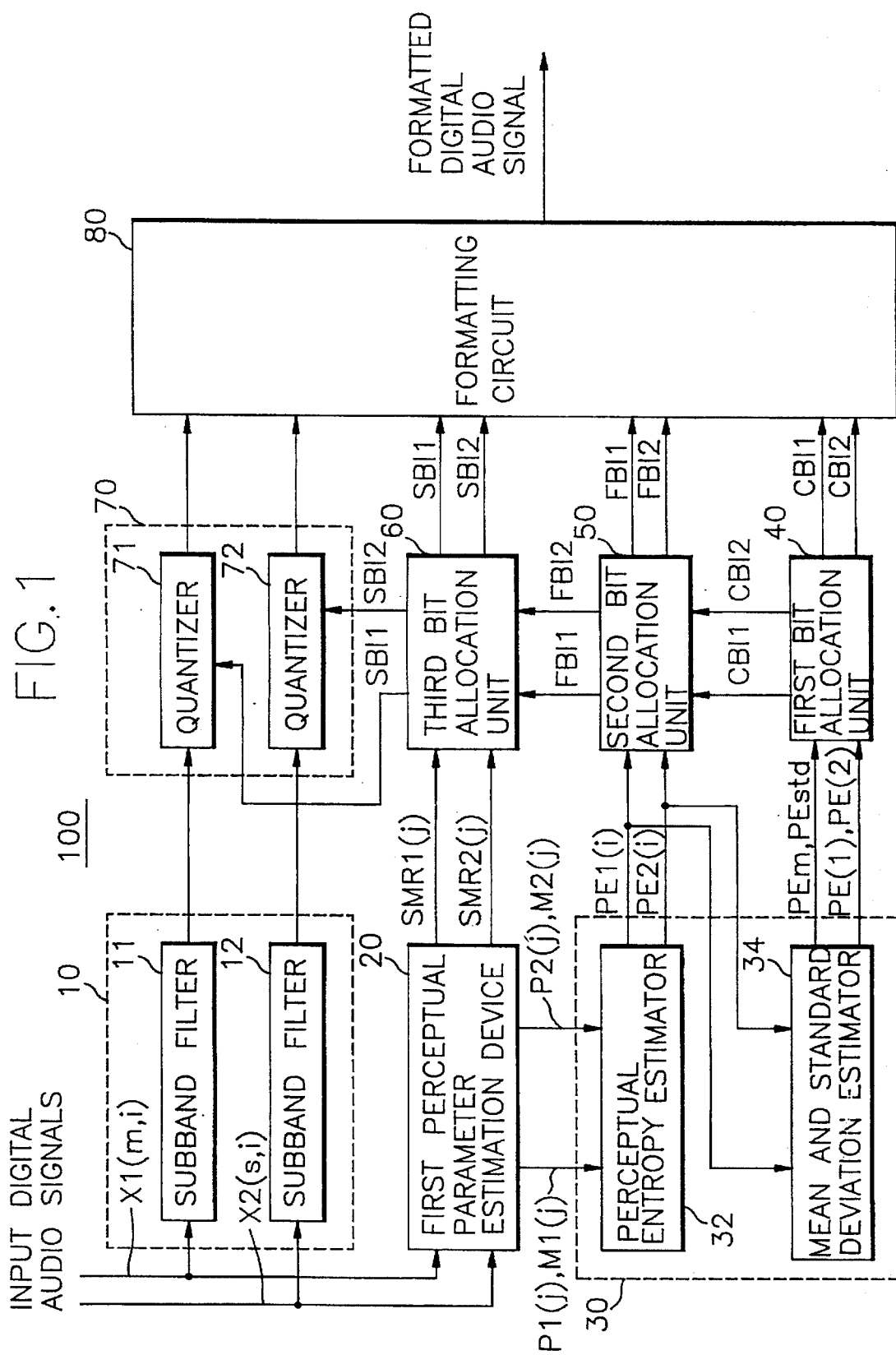
FIG. 1 shows a block diagram schematically illustrating the novel apparatus for adaptively encoding input digital audio signals from a plurality of channels in accordance with the present invention.

Referring to FIG. 1, there is shown a block diagram schematically illustrating an encoding apparatus 100 in accordance with the present invention.

The encoding apparatus 100 comprises a subband filtering device 10, first and second perceptual parameter estimation devices 20 and 30, first, second and third bit allocation units 40, 50 and 60, a quantizing device 70 and a formatting circuit 80.

In the encoding apparatus 100, input digital audio signals $X1(m,i)$ and $X2(s,i)$ of ith frames(or current frames), received through N, e.g., 2, i.e., 1st(or L) and 2nd(or R) channels, are applied to the first perceptual parameter estimation device 20 and the subband filtering device 10 wherein the respective input digital audio signals include M and S samples so that m=0, 1, ..., M−1; s=0, 1, ..., S−1 and M and S are positive integers wherein the number of each of M and S samples is directly proportional to the sampling frequency for each of the input digital audio signals from the channels. A "frame" used herein denotes a part of the digital audio signal which corresponds to a fixed number of audio samples and is a processing unit for the encoding and decoding of the digital audio signal.

As shown, the subband filtering device 10 includes a plurality of subband filters, e.g., two subband filters 11 and 12, which are coupled in parallel in order to simultaneously receive the input digital audio signals of the current frames and carry out the filtering of the input digital audio signals from the 1st and the 2nd channels by employing a subband filtering technique well known in the art, e.g., the method disclosed in the so-called MPEG Audio Algorithm described in ISO/IEC JTC1/SC2/WG 11, "Part 3, Audio Proposal", CD-11172-3(1991). That is, each of the subband filters 11 and 12 serves to split the input digital audio signal with a sampling frequency $f_s$ into B, e.g., 32, equally spaced subbands with sampling frequencies of $f_s/B$ and provides the quantizing device 70 with the split subband audio samples.

On the other hand, the first perceptual parameter estimation device 20 receives the input digital audio signals of the current frames from the 1st and the 2nd channels and performs to estimate signal-to-mask ratio(SMR) data SMR1 and SMR2, sound pressure levels P1 and P2, and the masking thresholds M1 and M2 for the respective subbands included in the current frames from the 1st and the 2nd channels by using a psychoacoustic model discussed in, e.g., the MPEG Audio Algorithm. The SMR1 for each subband from the 1st channel is obtained as:

$$SMR1(j)=P1(j)-M1(j) \qquad \text{Eq. (1)}$$

wherein j is a subband index with j=0, 1, ..., B−1, B being the total number of subbands in a frame; SMR1(j), a signal-to-mask ratio in subband j of the 1st channel; P1(j), a sound pressure level in subband j of the 1st channel estimated from a FFT(Fast Fourier Transform) technique; M1(j), a masking threshold in subband j of the 1st channel; and SMR1(j), P1(j) and M1(j) are all in a dB(decibel) unit.

Similarly, the SMR2 for each subband from the 2nd channel may be derived as:

$$SMR2(j)=P2(j)-M2(j) dB \qquad \text{Eq. (2)}$$

wherein j has the same meaning as previously defined.

The masking threshold represents an audible limit which is a sum of the intrinsic audible limit or threshold of a sound and an increment caused by the presence of other tonal and non-tonal components of the audio signal. The signal-to-mask ratio data SMR1(j)'s and SMR2(j)'s of the 1st and the 2nd channels are then fed to the third bit allocation unit 60, while the sound pressure levels P1(j)'s and P2(j)'s and the masking thresholds M1(j)'s and M2(j)'s of the 1st and the 2nd channels are coupled to the second perceptual parameter estimation device 30 which includes a perceptual entropy estimator 32 and a mean and standard deviation estimator 34.

The perceptual entropy estimator 32 serves to estimate perceptual entropies PE1(i) and PE2(i) for ith frames of the 1st and the 2nd channels based on the sound pressure levels P1(j) and P2(j) and the masking thresholds M1(j) and M2(j) fed from the first perceptual parameter estimation device 20. The perceptual entropy PE1(i) for the ith frame of the 1st channel, as well known in the art, may be represented as:

$$PE1(i) = \frac{1}{B} \sum_{j=0}^{B-1} \text{MAX}\left[ 0, \frac{1}{2} \log_2 \frac{P1(j)}{M1(j)} \right] \text{dB} \qquad \text{Eq. (3)}$$

wherein i, j and B have the same meanings as previously defined.

Similarly, the perceptual entropy PE2(i) for the ith frame of the 2nd channel, as well known in the art, may be obtained as:

$$PE2(i) = \frac{1}{B} \sum_{j=0}^{B-1} \text{MAX}\left[ 0, \frac{1}{2} \log_2 \frac{P2(j)}{M2(j)} \right] \text{dB} \qquad \text{Eq. (4)}$$

wherein i, j and B have the same meanings as previously defined.

Eqs. (3) and (4) can be obtained by applying the so-called rate distortion theory; and correspond to perceptual entropies based on the human auditory perception. The perceptual entropies for the ith frames of the 1st and the 2nd channels estimated at the perceptual entropy estimator 32 are then sent to the second bit allocation unit 50 and the mean and standard deviation estimator 34.

The mean and standard deviation estimator 34 is adapted to group the estimated perceptual entropies, i.e., PE1(i−1), PE1(i), PE2(i−1) and PE2(i) for Q, e.g., 4, number of the current and its previous frames of the 1st and the 2nd channels, which are fed from the perceptual entropy estimator 32 in order to adaptively allocate bits between the 1st and the 2nd channels in accordance with the processing of the first bit allocation unit 40 which will be described in details hereinafter with reference to FIG. 2; and estimates a mean and a standard deviation parameters representing their statistical properties by using the total perceptual entropies estimated for an inter-channel frame group including the four current and previous frames for the 1st and the 2nd channels. The mean parameter PEm for the total perceptual entropies of the inter-channel frame group, as well known in the art, may be estimated as:

$$PEm = \frac{1}{Q} \sum_{p=0}^{Q-1} PE(p) \qquad \text{Eq. (5)}$$

wherein p is a frame index used in the inter-channel frame group with p=0, 1, ..., Q−1, Q being the total frame number of the inter-channel frame group; and PE(p) represents a perceptual entropy of a pth frame in the inter-channel frame group.

Accordingly, the standard deviation parameter PEstd for the total perceptual entropies of the inter-channel frame group, as well known in the art, may be represented as:

$$PEstd = \sqrt{\frac{1}{Q} \sum_{p=0}^{Q-1} [PE(p) - PEm]^2} \qquad \text{Eq. (6)}$$

wherein p and Q have the same meanings as previously defined.

In a preferred embodiment of the present invention, the mean and standard deviation estimator 34 also groups the estimated perceptual entropies, i.e., PE1(i) and PE1(i−1), and PE2(i) and PE2(i−1) for F, e.g., 2, number of the current and its previous frames for each of the 1st and the 2nd channels, respectively, in order to adaptively allocate bits to each of the 1st and the 2nd channels and the respective frames included in each of the channels in accordance with their perceptual entropies, and generates perceptual entropies PE(1) and PE(2) for two intra-channel frame groups of the 1st and the 2nd channels. The perceptual entropies PE(1) and PE(2) for the first and the 2nd channels and the mean and standard deviation parameters PEm and PEstd, generated and estimated at the mean and standard deviation estimator 34 are then transmitted to the first bit allocation unit 40.

The first bit allocation unit 40 is adapted to determine bits for the two intra-channel frame groups of the 1st and the 2nd channels based on the perceptual entropies PE(1) and PE(2) and the mean and standard deviation parameters PEm and PEstd from the mean and standard deviation estimator 34, and provides the second bit allocation unit 50 and the formatting circuit 80 with bit allocation information CBI1 and CBI2 corresponding to the determined bits for the two intra-channel frame groups of the 1st and the 2nd channels.

Figure 2:
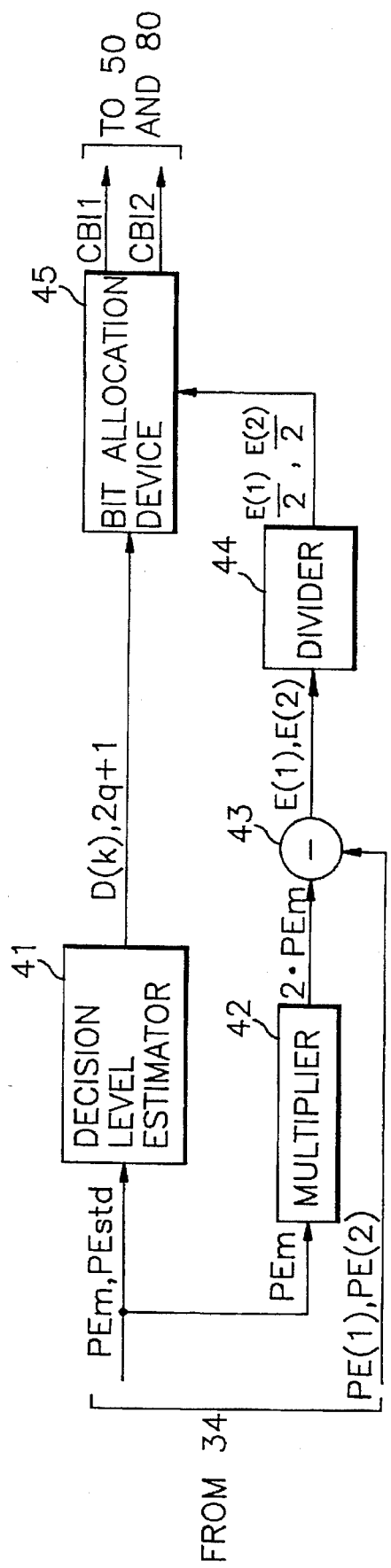
FIG. 2 depicts a detailed block diagram of the first bit allocation unit shown in FIG. 1.

Referring to FIG. 2, there is shown a detailed block diagram of the first bit allocation unit 40 shown in FIG. 1. The first bit allocation unit 40 comprises a decision level estimator 41, a multiplier 42, a subtractor 43, a divider 44 and a bit allocation device 45.

The decision level estimator 41 serves to estimate optimal decision levels of the inter-channel frame group for the bit allocation device 45 to allocate bits to the two intra-channel frame groups of the 1st and the 2nd channels, respectively, depending on the mean and standard deviation parameters PEm and PEstd from the mean and standard deviation estimator 34 shown in FIG. 1. In accordance with a preferred embodiment of the present invention, a kth decision level D(k) of the inter-channel frame group may be derived as:

$$D(k) = NF \cdot PEstd \cdot k \qquad \text{Eq. (7)}$$

wherein k is a decision level index with k=−q to q, q being a positive integer, and NF is a normalization factor in the inter-channel frame group.

As can be seen from Eq. (7), the level interval between the kth decision level D(k) and a (k−1)st decision level D(k−1) of the inter-channel frame group depends on both the standard deviation PEstd from the mean and standard deviation estimator 34 and the normalization factor NF of the inter-channel frame group, while the total number, e. g., 2q+1, of decision levels is predetermined. It should be appreciated that the total number of decision levels can be determined based on the required coding efficiency and the audio quality of the encoding apparatus. The normalization factor NF of the inter-channel frame group used in the decision level estimator 41 can be preferably determined by employing the mean and standard deviation parameters PEm and PEstd from the mean and standard deviation estimator 34 and a global mean and a mean of global standard deviation parameters, PEgm and PEgstd, prestored in a memory(not shown) thereof in order to derive the optimal decision levels of the inter-channel frame group, which closely match the actual human auditory perception. Each of the global mean and the mean of global standard deviation parameters may be easily measured by using the mean and standard deviation parameters estimated for a predetermined duration, respectively. In accordance with the present invention, the normalization factor NF of the inter-channel frame group may be obtained as follows:

$$NF = \left(\frac{PEgstd}{PEgm}\right) \cdot \left(\frac{PEm}{PEstd}\right) \qquad \text{Eq. (8)}$$

As can be seen from Eqs. (7) and (8), it should be noted that the decision levels of the inter-channel frame group can be determined as an integer multiple of the mean parameter therefor. The decision levels and the total number of decision levels, estimated and predetermined at the decision level estimator 41 are provided to the bit allocation device 45.

On the other hand, the multiplier 42 multiplies the mean parameter PEm fed from the mean and standard deviation estimator 34 shown in FIG. 1 with a coefficient F, e.g., 2, in this case, prestored in a memory(not shown) thereof, representing the total number of frames included in any one of the two intra-channel frame groups to thereby generate a multiplied output parameter 2·PEm. The output parameter 2·PEm generated at the multiplier 42 and the perceptual entropies PE(1) and PE(2) for the two intra-channel frame groups from the mean and standard deviation estimator 34 shown in FIG. 1 are then sent to the subtractor 43 which is adapted to calculate difference signals E(1) and E(2) for the two intra-channel frame groups by subtracting each of the perceptual entropies PE(1) and PE(2) from the output parameter 2·PEm, respectively, and generates calculated difference signals E(1) and E(2). The divider 44 is adapted to receive the difference signals E(1) and E(2) from the subtractor 43 to thereby divide the respective difference signals into the predetermined frame number F, e.g., 2, in this case, included in any one of the intra-channel frame groups, in order to obtain the optimal decision levels for averaging the difference signals, respectively, and generates divided difference signals E(1)/2, E(2)/2. Subsequently, the decision levels D(k)'s and the total number, i.e., 2q+1, of the decision levels, which have been estimated and predetermined at the decision level estimator 41, and the difference signals E(1)/2 and E(2)/2 generated from the divider 44 are simultaneously provided to the bit allocation device 45.

The bit allocation device 45 serves to determine bits for each of the two intra-channel frame groups of the 1st and the 2nd channels based on the decision levels and the total number of decision levels from the decision level estimator 41 and the difference signals from the divider 44. In accordance with a preferred embodiment of the present invention, the bit allocation FB for each channel may be determined as:

$$FB(r) = F \cdot FBm + \frac{F \cdot BV}{2q+1} \cdot I \qquad \text{Eq. (9)}$$

wherein r is a positive integer used as a channel index; FBm, mean bits, e.g., 3072 bits per frame for 16-bit PCM(Pulse Code Modulation) audio data with 48 KHz sampling frequency at 128 Kbps data transmission rate per channel; BV, a predetermined bit variation value; 2q+1, the total number of predetermined decision levels; I, a level index in channel r; and F has the same meaning as previously defined.

As can be seen from Eq. (9), the bit allocation for the rth channel, FB(r), can be determined by adding the total number of mean bits, F·FBm, with the number of varied bits which can be derived from the second term thereof. The predetermined bit variation value BV therein may be determined as a value representing the bit variation range between minimum bits and maximum bits of the bit allocation which may vary among the respective channels; and the level index I for the intra-channel frame group of the rth channel can be obtained based on the decision levels D(k)'s from the decision level estimator 41 and each of the difference signals E(1)/2 and E(2)/2 from the divider 44. In accordance with the present invention, the level index I for the intra-channel frame group of the rth channel may be represented as shown in Table(wherein it is assumed that the interval of decision levels is 1.27 and the decision level index k is −2 to 2):

TABLE

| Range of decision level D | Level index (I) |
| --- | --- |
| ~ −2.56 | −2 |
| −2.55 ~ −1.28 | −1 |
| −1.27 ~ 1.26 | 0 |
| 1.27 ~ 2.54 | 1 |
| 2.55 ~ | 2 |

As can be seen from the above Table, if the difference signal E(r) for the intra-channel frame group of the rth channel exists between the decision levels −2.55 and −1.28, then the level index I thereof may be selected as −1; and if it is between the decision levels −1.27 and 1.26, then the level index I may be chosen as 0, and so on. In this manner, the bit allocation FB(r) for the intra-channel frame group of the rth channel can be advantageously determined by employing Eq. (9).

Subsequently, the bit allocation information CBI1 and CBI2 of the 1st and the 2nd channels corresponding to the determined bits for the respective channels at the bit allocation unit 45 and the perceptual entropies PE1(i) and PE2(i) from the perceptual entropy estimator 32 shown in FIG. 1 are simultaneously applied to the second bit allocation unit 50; and the bit allocation information CBI1 and CBI2 for the respective channels is supplied to the formatting circuit 80.

Referring back to FIG. 1, the second bit allocation unit 50 determines bits for the respective frames included in each of the two intra-channel frame groups for the 1st and the 2nd channels based on their corresponding perceptual entropies from the perceptual entropy estimator 32 and the bit allocation information CBI1 and CBI2 from the first bit allocation unit 40. At the second bit allocation unit 50, the bit allocation for the respective frames in each of the two intra-channel frame groups may be preferably determined by employing a bit allocation technique, for use in a digital audio encoding apparatus, disclosed in a copending commonly owned application, U.S. Ser. No. 367,541, filed Dec. 30, 1994, entitled "Adaptive Digital Audio Encoding Apparatus and a Bit Allocation Method Thereof", now U.S. Pat. No. 5,537,510.

Subsequently, bit allocation information FBI1 and FBI2 of the 1st and the 2nd channels corresponding to the determined bits for the respective frames included in each of the two intra-channel frame groups for the 1st and the 2nd channels at the second bit allocation unit 50, and the signal-to-mask ratio data SMR1(j) and SMR2(j) from the first perceptual parameter estimation device 20 shown in FIG. 1 are simultaneously supplied to the third bit allocation unit 60; and the bit allocation information FBI1 and FBI2 are applied to the formatting circuit 80.

The third bit allocation unit 60 receives the signal-to-mask ratio data SMR1 and SMR2 fed from the first perceptual parameter estimation device 20 and the bit allocation information FBI1 and FBI2 for the respective frames supplied from the second bit allocation unit 50, determines bits for every subband included in the respective frames of the two intra-channel frame groups and provides bit allocation information SBI1 and SBI2 corresponding to the determined bits for the respective subbands of the 1st and the 2nd channels to the quantizer 70 and the formatting circuit 80, respectively. The principle used in the third bit allocation unit 60 lies in the optimization of the total mask-to-noise ratio over a frame with the constraint that the number of bits used does not exceed the number of bits available for that frame transferred from the second bit allocation unit 50. Subsequently, the bit allocation information SBI1 and SBI2 for the respective subbands of the 1st and the 2nd channels from the third bit allocation unit 60 and the split subband audio samples from the subband filters 11 and 12 are simultaneously applied to the quantizing device 70 which includes a plurality of quantizers, e.g., 71 and 72.

Each of the quantizers 71 and 72 serves to adaptively quantize corresponding split subband audio samples from each of the subband filters 11 and 12 based on its corresponding bit allocation information from the third bit allocation unit 60 and provides the quantized audio signal for each of the 1st and the 2nd channels to the formatting circuit 80.

At the formatting circuit 70, the quantized audio samples from each of the quantizers 71 and 72 and the bit allocation information from the first, second and third bit allocation units 40, 50 and 60 are formatted and transmitted to a transmitter(not shown) for the transmission thereof, thereby improving the coding efficiency and the audio quality of the input digital audio signals from the 1st and the 2nd channels. The principles and function of the subband filtering device 10, the first perceptual parameter estimation device 20, the third bit allocation unit 60, the quantizing device 70 and the formatting circuit 80 are basically identical to those which can be found in the MPEG Audio Algorithm.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for adaptively encoding input digital audio signals from N number of channels wherein each of the input digital audio signals includes a plurality of frames and each frame includes a plurality of subbands wherein N is a positive integer, which comprises:

N number of subband filtering means arranged in parallel for receiving and filtering the input digital audio signals, respectively, on a subband-by-subband basis;

first estimation means for estimating signal-to-mask ratio data, sound pressure levels and masking thresholds for the respective subbands included in each of the input digital audio signals;

second estimation means for estimating perceptual entropies of the respective frames included in each of the input digital audio signals based on the estimated signal-to-mask ratio data, sound pressure levels and masking thresholds, to thereby derive a mean and a standard deviation parameters for an inter-channel frame group including N×F number of current and previous frames for the total N number of channels, said inter-channel frame group corresponding to the estimated perceptual entropies, and for generating an intra-channel frame group including F number of current and previous frames for each of the N number of channels wherein F is a positive integer;

first bit allocation means for adaptively determining bits for each of the intra-channel frame groups based on the estimated perceptual entropy for each of the intra-channel frame groups and the mean and standard deviation parameters and for generating bit allocation information corresponding to the determined bits for each of the intra-channel frame groups;

second bit allocation means for determining bits for the respective subbands included in each of the intra-channel frame groups based on the estimated signalto-mask ratio data and the generated bit allocation information, and for generating bit allocation information corresponding to the determined bits for each of the subbands;

N number of quantizing means arranged in parallel for quantizing the filtered subband audio signals for the N number of channels in response to the corresponding bit allocation information generated for the respective subbands in each of the intra-channel frame groups; and means for formatting the quantized audio signals together with the generated bit allocation information.

2. The apparatus as recited in claim 1, wherein said first bit allocation means includes:

means for estimating decision levels of the inter-channel frame group based on the estimated perceptual entropies, mean and standard deviation parameters;

means for generating a mean function by multiplying the mean parameter with a predetermined factor representative of the number of frames included in each of the intra-channel frame groups;

means for generating a difference signal representing the difference between each of the perceptual entropies for the intra-channel frame groups and the generated mean function, and for providing an averaged difference signal by dividing each of the generated difference signals into the predetermined factor; and bit allocation means for adaptively determining bits for each of the intra-channel frame groups based on the estimated decision levels, the total number of decision levels and each of the provided difference signals and for generating bit allocation information corresponding to the determined bits for each of the intra-channel frame groups.

3. The apparatus as recited in claim 2, wherein each of the decision levels of the inter-channel frame group, D, is determined as:

$$D = NF \cdot PEstd \cdot k$$

wherein k is a decision level index with k=−q to q, q being a positive integer, NF is a normalization factor in the inter-channel frame group; and PEstd is the standard deviation parameter of the inter-channel frame group.

4. The apparatus as recited in claim 2, wherein the bit allocation for a rth channel in the N number of channels, FB(r), is obtained as:

$$FB(r) = F \cdot FBm + \frac{F \cdot BV}{2q+1} \cdot I$$

wherein r is a positive integer used as a channel index; FBm, a function of mean bits for one frame; F, a factor representing the number of frames included in each of the intra-channel frame groups; BV, a predetermined bit variation value; 2q+1, the total number of predetermined decision levels; I, a level index in the rth channel.

* * * * *